Dixon & Sprague,
Fruit Gatherer.
No. 97,061. Patented Nov. 23, 1869.

Witnesses:
H. A. Clum
Frank Meyer

Inventors:
Napoleon B. Dixon
Myron W. Sprague

United States Patent Office.

NAPOLEON B. DIXON AND MYRON W. SPRAGUE, OF ROCHESTER, NEW YORK, ASSIGNORS TO N. B. DIXON.

Letters Patent No. 97,061, dated November 23, 1869.

IMPROVEMENT IN BAGS FOR GATHERING FRUIT.

The Schedule referred to in these Letters Patent and making part of the same.

Be it known that we, NAPOLEON B. DIXON and MYRON W. SPRAGUE, of Rochester, in the county of Monroe, and State of New York, have invented a new and useful Improvement in Bags for Gathering Fruit; and we also hereby declare that the following is a full, clear, and exact description of the construction and operation of the same, reference being had to the annexed drawings, making a part of this specification, in which—

To enable those skilled in the art to make and use our invention, we will proceed to describe its construction and operation.

Figure 1:
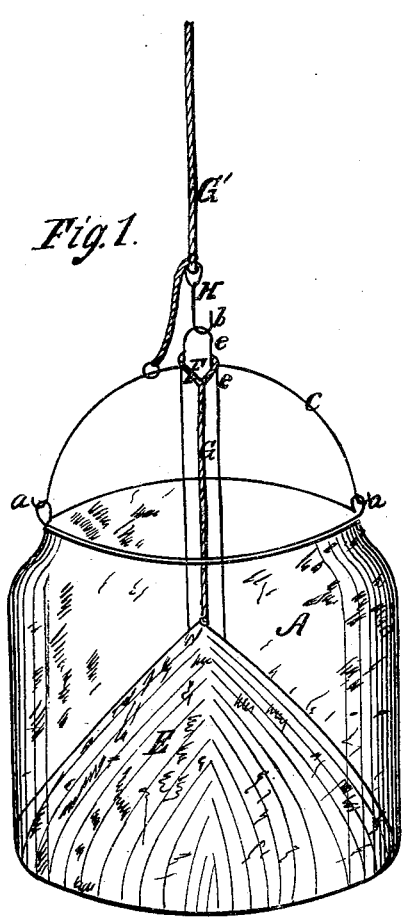
Figure 1 is a view of the bag closed and ready for use.
Figure 2:
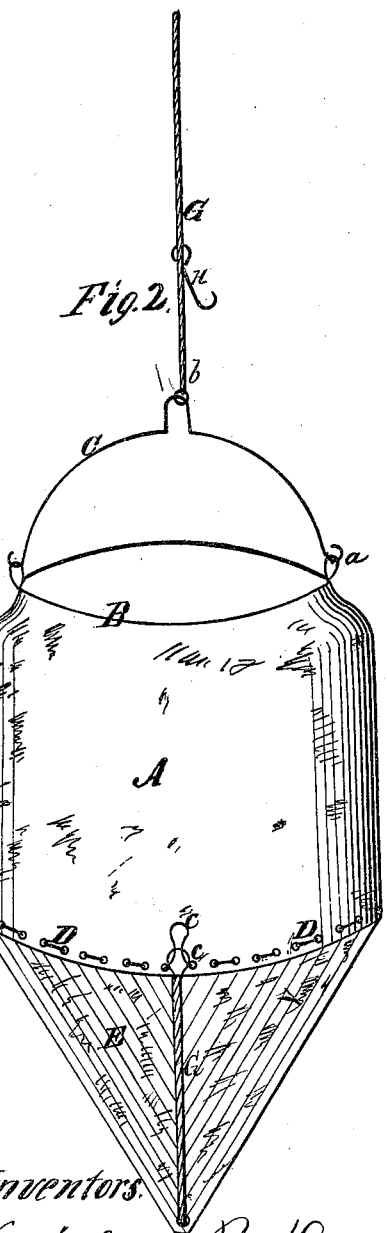
Figure 2 is a view of the bag, with the safety-skirt dropped and the gathering-cord released, showing the bottom of the bag open for the discharge of the fruit.

We construct the bag A, fig. 1, of any required size and of any suitable material.

The upper end of the bag is distended by a hoop, B, provided with loops or eyes $a\ a$, to which is attached a bail, C, having a portion of its upper part bent into a yoke, $b$.

Around the opening of the lower end of the bag we insert eyelets, through which is run a cord, D, whereby is gathered in and closed the end of the bag.

The end of said cord is formed into a loop, $c$, which, when the bag is used, is passed over the yoke of the bail, as shown in fig. 1.

The bag is also provided, when needed, with a safety-skirt or lappet, E, attached to and across one side of its lower and open end, whereas the other end of the lappet is free, and terminating with a cord, G, provided with a loop, F, which, when the bag is used, is passed over the bail-yoke, in like manner as the first, and before the hook H, by which the bag is suspended, is hooked into the yoke, preparatory to the bag being raised into the tree for use, as shown in the drawing, fig. 1.

The rope G', whereby the bag is handled while in use, has its lower end attached to the yoke. A short distance above its attachment therewith, is secured a hook, H, above referred to. By said hook the bag is suspended when in use or being filled with fruit.

The attachment of the rope to the bail has no other object than to disengage or cast off the loops when the bag is emptied, and to draw it up again into the tree for readjustment.

It will be seen that on using the bag, the gathering-cord D and safety-lappet or skirt are first looped over the yoke before the lifting-rope is hooked into it, thereby effectually closing the bottom of the bag.

The practical operation of this bag is as follows:

The bottom of the bag, on being closed as above described, is then raised into the tree to be filled, which, when done, is then lowered to the ground. The hook drops out of the yoke. The rope, on being drawn tight, throws off the loops. The bag may now be drawn up; the safety-skirt falls off, the gathering-cord relaxes, and the fruit is discharged through the lower end of the bag.

Fruit thus discharged is less liable to injury from bruises than when the bag is turned bottom upward for discharging.

We are aware that fruit-bags have been used, having an opening at the bottom through which to discharge the fruit; therefore we do not claim broadly a fruit-bag having a discharging-opening at the bottom; but

What we claim as our invention, and desire to secure by Letters Patent, is—

A fruit-bag, so constructed that the mouth thereof is distended by a hoop, B, provided with a bail, C, yoke $b$, hook H, gathering-cords D, and a lappet, E, all arranged and combined to operate in the manner substantially as described, and for the purpose set forth.

NAPOLEON B. DIXON.
MYRON W. SPRAGUE.

Witnesses:
H. A. CLUM,
F. N. BINGHAM.